United States Patent
Toda

(10) Patent No.: US 9,781,625 B2
(45) Date of Patent: Oct. 3, 2017

(54) PORTABLE INFORMATION TERMINAL, COMMUNICATION SYSTEM, COMMUNICATION CONTROL METHOD, AND PROGRAM

(71) Applicant: NEC Corporation, Minato-ku, Tokyo (JP)

(72) Inventor: Yasushi Toda, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 40 days.

(21) Appl. No.: 14/762,707

(22) PCT Filed: Jan. 21, 2014

(86) PCT No.: PCT/JP2014/000265
§ 371 (c)(1),
(2) Date: Jul. 22, 2015

(87) PCT Pub. No.: WO2014/132549
PCT Pub. Date: Sep. 4, 2014

(65) Prior Publication Data
US 2015/0358851 A1    Dec. 10, 2015

(30) Foreign Application Priority Data
Feb. 26, 2013    (JP) .................................. 2013-035691

(51) Int. Cl.
*H04W 4/00* (2009.01)
*H04W 28/02* (2009.01)
(Continued)

(52) U.S. Cl.
CPC ....... *H04W 28/0221* (2013.01); *H04W 40/32* (2013.01); *H04W 52/0219* (2013.01);
(Continued)

(58) Field of Classification Search
CPC ......... H04W 28/0221; H04W 52/0229; H04W 76/04; H04W 52/0251; H04W 52/0219;
(Continued)

(56) References Cited

U.S. PATENT DOCUMENTS 6,396,814 B1 *  5/2002  Iwamura ......... H04M 1/274566
                                                                   370/252
2010/0267368 A1  10/2010  Masputra
(Continued)

FOREIGN PATENT DOCUMENTS

JP    2009-159409 A    7/2009
JP    2011-066869 A    3/2011
(Continued)

OTHER PUBLICATIONS

International Search Report for PCT Application No. PCT/JP2014/000265, mailed on Apr. 8, 2014.
(Continued)

*Primary Examiner* — Clemence Han

(57) ABSTRACT

A portable information terminal provided with a group terminal connection status management section which manages the connection statuses of a plurality of portable information terminals belonging to the same group connected by a tethering function; a host terminal order determination section which determines selection order of a portable information terminal to serve as a host terminal from among the portable information terminals belonging to the same group including its own terminal, based at least on reception quality from the base station, remaining battery capacity, and either a contracted allowable data transmission speed or a maximum data transmission speed notified from a network; and a control section which controls whether to operate as the host terminal or to communicate with the base station via the host terminal, based on the determined selection order.

10 Claims, 10 Drawing Sheets

(51) Int. Cl.
*H04W 76/04* (2009.01)
*H04W 52/02* (2009.01)
*H04W 40/32* (2009.01)
*H04W 88/04* (2009.01)
*H04W 88/06* (2009.01)
*H04L 29/08* (2006.01)

(52) U.S. Cl.
CPC ... *H04W 52/0229* (2013.01); *H04W 52/0251* (2013.01); *H04W 76/04* (2013.01); *H04L 67/303* (2013.01); *H04W 88/04* (2013.01); *H04W 88/06* (2013.01); *Y02B 60/50* (2013.01)

(58) Field of Classification Search
CPC ..... H04W 40/32; H04W 88/04; H04W 88/06; H04L 67/1051
See application file for complete search history.

(56) References Cited

U.S. PATENT DOCUMENTS

| | | | |
|---|---|---|---|
| 2010/0311402 A1* | 12/2010 | Srinivasan | H04W 8/183 455/418 |
| 2011/0280152 A1* | 11/2011 | Saito | H04W 84/20 370/254 |
| 2012/0120934 A1* | 5/2012 | Cho | H04W 40/24 370/338 |
| 2012/0147811 A1 | 6/2012 | Ohyama et al. | |
| 2013/0223425 A1* | 8/2013 | Kim | H04W 48/20 370/338 |
| 2014/0126461 A1* | 5/2014 | Ghosh | H04W 88/04 370/315 |
| 2014/0206346 A1* | 7/2014 | Kiukkonen | H04W 52/0229 455/426.1 |

FOREIGN PATENT DOCUMENTS

| | | |
|---|---|---|
| JP | 2012-524499 A | 10/2012 |
| JP | 2012-227610 A | 11/2012 |

OTHER PUBLICATIONS

Wi-Fi Alliance, "Wi-Fi Peer-to-Peer (P2P) Technical Specification Version 1.1", Wi-Fi Alliance Technical Committee P2P Task Group, pp. 1-159, XP009163866, Jan. 1, 2010.

Extended European Search Report for EP Application No. EP14757604.5 dated on Oct. 6, 2016.

* cited by examiner

PORTABLE INFORMATION TERMINAL, COMMUNICATION SYSTEM, COMMUNICATION CONTROL METHOD, AND PROGRAM

CROSS-REFERENCE TO RELATED APPLICATIONS

This is a national stage of International Application No. PCT/JP2014/000265 filed Jan. 21, 2014, claiming priority based on Japanese Patent Application No. 2013-035691 filed Feb. 26, 2013, the entire contents of which are incorporated herein by reference.

TECHNICAL FIELD

The present invention relates to a portable information terminal, a communication system, a communication control method, and a program.

BACKGROUND ART

In recent years, mobile phones and portable information terminals such as smartphones have a tethering function as a technique for connecting a portable information terminal to abase station so as to operate as a wireless router, connecting other personal devices with the portable information terminal by wireless LAN, and thereby connecting these devices to a network via the portable information terminal.

For example, in Patent Document 1, an advanced tethering system has been proposed to be provided, in which a portable information terminal can access the Internet via a host terminal operating as a wireless router and use other services (applications).

PRIOR ART DOCUMENT

Patent Document

Patent Document 1: JP-T-2012-524499

SUMMARY OF INVENTION

Problem to be Solved by the Invention

However, there is a problem in the above-described Patent Document 1 in that, since a portable information terminal serving as a host terminal is fixed as in the cases of general tethering techniques, other portable information terminals are forced to make data communication under a poor communication quality environment even when the data communication can be made under a better communication environment, or the connection is lost during the communication due to the battery of the portable information terminal running out.

An object of the present invention is to provide a portable information terminal, a communication system, a communication control method, and a program capable of actualizing data communication by an efficient tethering function while preventing excessive battery drain in a particular portable information terminal.

Means for Solving the Problem

A portable information terminal of the present invention is a portable information terminal having a tethering function for operating as a host terminal which is connected to a base station using a first wireless communication and connects other portable information terminals to the base station using a second wireless communication, comprising: a group terminal connection status management section which manages connection statuses of a plurality of portable information terminals belonging to the same group connected by the tethering function; a host terminal order determination section which determines selection order of a portable information terminal to serve as the host terminal from among the portable information terminals belonging to the same group including its own terminal and managed by the group terminal connection status management section, based at least on reception quality from the base station, remaining battery capacity, and either a contracted allowable data transmission speed or a maximum data transmission speed notified from a network; and a control section which controls whether to operate as the host terminal or to communicate with the base station via the host terminal, based on the selection order determined by the host terminal order determination section.

A communication system constituted by a plurality of portable information terminals having a tethering function for operating as a host terminal which is connected to a base station using a first wireless communication and connects other portable information terminals to the base station using a second wireless communication, and a server connected to the base station, the server comprising: a group terminal connection status management section which manages connection statuses of the plurality of portable information terminals belonging to the same group connected by the tethering function; a host terminal order determination section which determines selection order of a portable information terminal to serve as the host terminal from among the portable information terminals belonging to the same group including its own terminal and managed by the group terminal connection status management section, based at least on reception quality from the base station, remaining battery capacity, and either a contracted allowable data transmission speed or a maximum data transmission speed notified from a network; and a first control section which, when there is no portable information terminal operating as the host terminal, provides an instruction to a portable information terminal that can operate as the host terminal to serve as the host terminal, based on the selection order determined by the host terminal order determination section, and wherein the plurality of portable information terminals comprise: a second control section which controls to operate as a host terminal connected to the base station using the second wireless communication, according to the instruction from the server.

A communication control method of the present invention is a communication control method for a portable information terminal having a tethering function for operating as a host terminal which is connected to a base station using a first wireless communication and connects other portable information terminals to the base station using a second wireless communication, comprising: a group terminal connection status management step of managing connection statuses of a plurality of portable information terminals belonging to the same group connected by the tethering function; a host terminal order determination step of determining selection order of a portable information terminal to serve as the host terminal from among the portable information terminals belonging to the same group including its own terminal, based at least on reception quality from the base station, remaining battery capacity, and either a contracted allowable data transmission speed or a maximum data transmission speed notified from a network; and a control step of controlling whether to operate as the host terminal or to communicate with the base station via the host terminal, based on the selection order determined in the host terminal order determination step.

A program of the present invention is a non-transitory computer-readable storage medium having stored thereon a program that is executable by a processor in a portable information terminal having a tethering function for operating as a host terminal which is connected to a base station using a first wireless communication and connects other portable information terminals to the base station using a second wireless communication, the program being executable by the processor to actualize functions comprising: a group terminal connection status management function for managing connection statuses of a plurality of portable information terminals belonging to the same group connected by the tethering function; a host terminal order determination function for determining selection order of a portable information terminal to serve as the host terminal from among the portable information terminals belonging to the same group including its own terminal, based at least on reception quality from the base station, remaining battery capacity, and either a contracted allowable data transmission speed or a maximum data transmission speed notified from a network; and a control function for controlling whether to operate as the host terminal or to communicate with the base station via the host terminal, based on the selection order determined by the host terminal order determination function.

Effect of the Invention

According to the present invention, data communication by an efficient tethering function can be actualized in which excessive battery drain in a particular portable information terminal is prevented.

DESCRIPTION OF EMBODIMENTS

Hereinafter, an embodiment of the present invention will be described with reference to the drawings.

Figure 1:
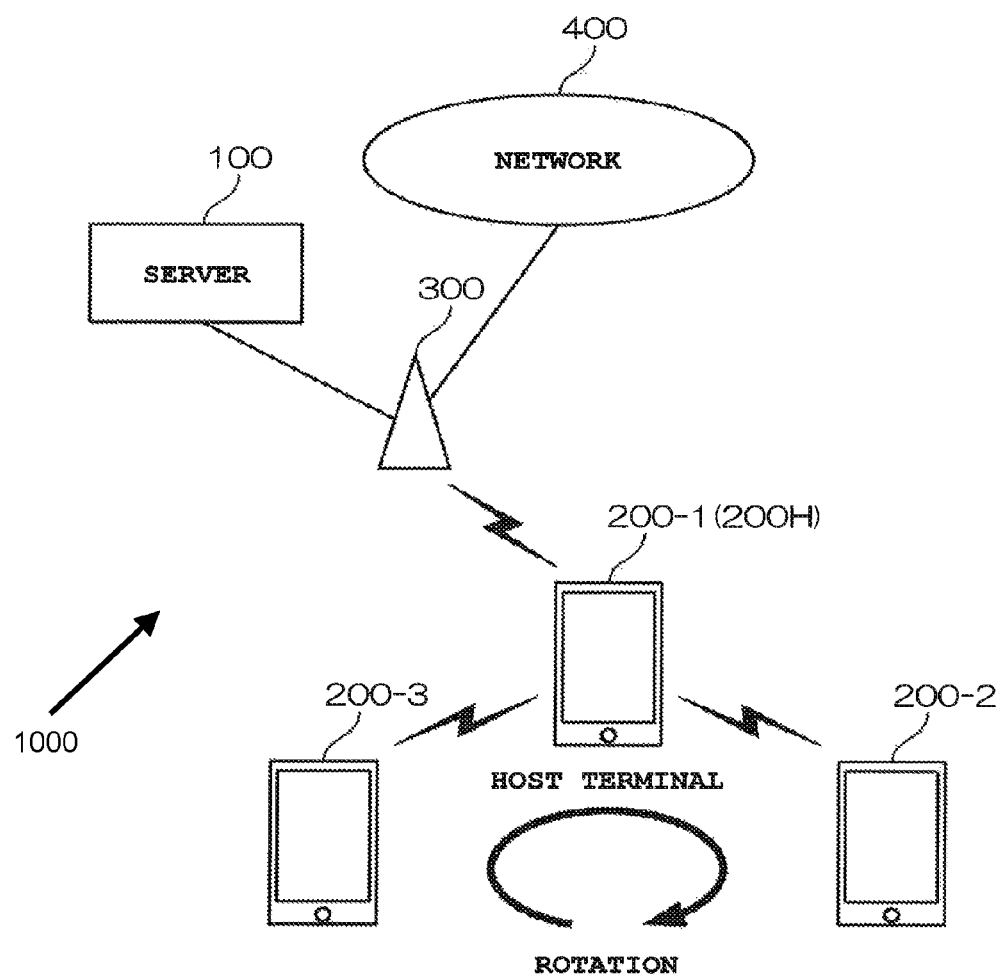
FIG. 1 is a block diagram showing the configuration of a communication system 1000 constituted by a server 100 and portable information terminals 200-1 to 200-3 according to an embodiment of the present invention.

FIG. 1 is a block diagram showing the configuration of a communication system 1000 constituted by a server 100 and portable information terminals 200-1 to 200-3 according to an embodiment of the present invention.

In FIG. 1, the server 100 has been connected to the Internet or a network 400 constituted by a communication line network and the like via a base station 300. The portable information terminals 200-1, 200-2, and 200-3 have a communication function for making data communication with the base station 300, and a wireless router function (tethering function) by which data communication between portable information terminals can be made using wireless LAN (Local Area Network) or the like.

The portable information terminals 200-1 to 200-3 use these functions in combination so as to connect a particular portable information terminal to the base station 300 as a host terminal 200H and connect the other portable information terminals 200-2 and 200-3 to the host terminal 200H by wireless LAN (tethering function). The portable information terminals 200-2 and 200-3 make communication with the base station 300 via the host terminal 200H connected using wireless LAN, and are connected to the network 400 thereby.

In the example of FIG. 1, the portable information terminal 200-1 has been connected to the base station 300 as the host terminal 200H, and the portable information terminals 200-2 and 200-3 have been connected to the portable information terminal 200-1 serving as the host terminal 200H by wireless LAN. That is, the portable information terminal 200-1 serving as the host terminal 200H is functioning as a wireless router. Note that, as a method for connecting to the host terminal 200H, Bluetooth (registered trademark) and the like may be used besides wireless LAN.

In this embodiment, the portable information terminals 200-1 to 200-3 switch (rotate) the portable information terminal 200 serving as the host terminal 200H during tethering, based at least on reception quality from the base station 300 in each portable information terminal, remaining battery capacity of each portable information terminal, and either an allowable data transmission speed contracted for each portable information terminal or a maximum data transmission speed notified from the network 400. The switching of the host terminal 200H can be performed on the portable information terminal 200-1 to 200-3 side or can be performed by an instruction from the server 100.

Figure 2:
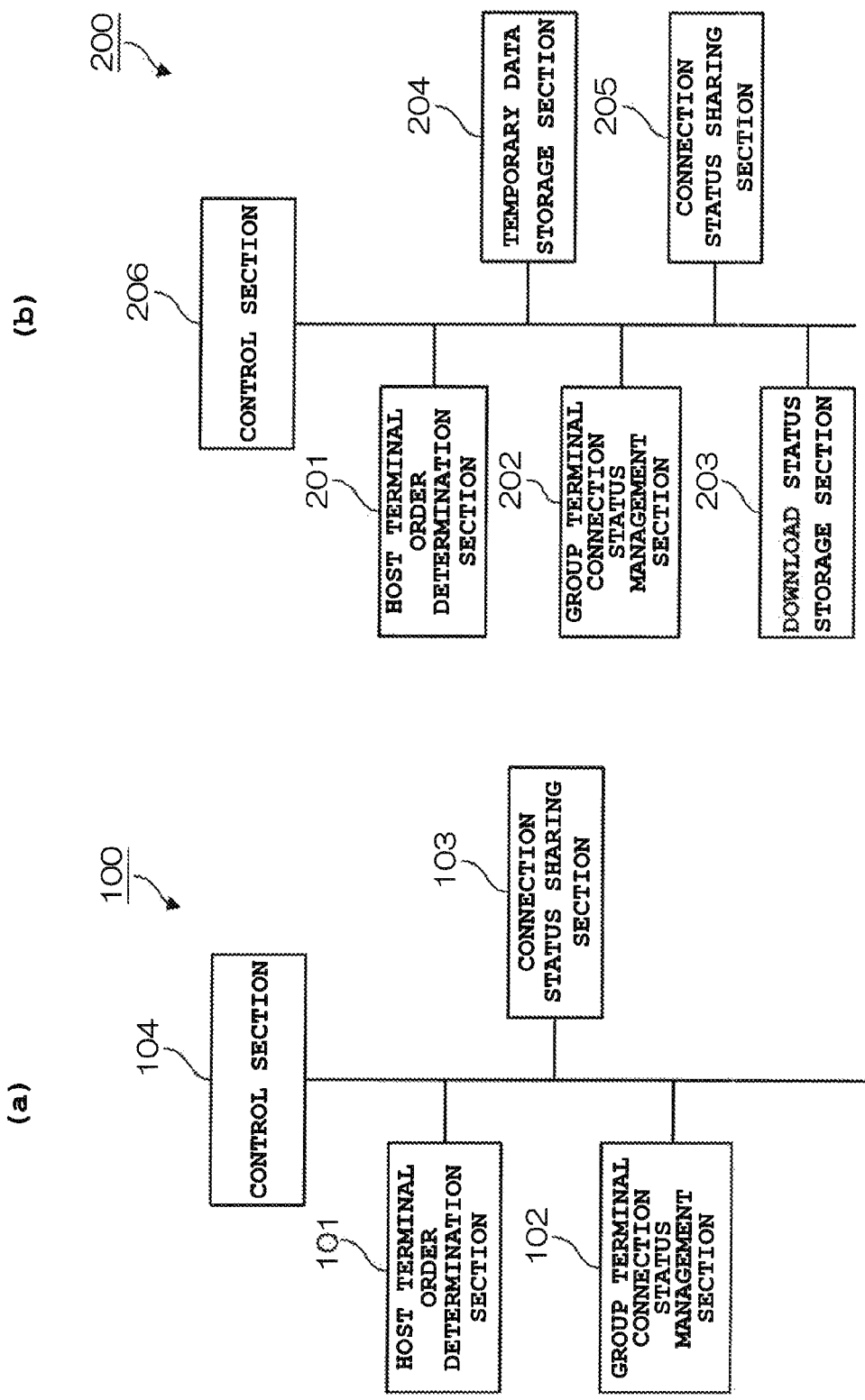
FIG. 2(a) is a block diagram showing the functional configuration of the server 100 according to the embodiment.
FIG. 2(b) is a block diagram showing the functional configuration of the portable information terminals 200-1 to 200-3 according to the embodiment.

FIG. 2(a) is a block diagram showing the functional configuration of the server 100 according to the embodiment, and FIG. 2(b) is a block diagram showing the functional configuration of the portable information terminals 200-1 to 200-3 according to the embodiment. Note that, in FIG. 2 (a) and FIG. 2 (b), only components related to the present invention have been shown and therefore a communication section, a display section, an input section, and the like have been omitted. Also, in the following descriptions, the portable information terminals 200-1 to 200-3 are collectively referred to as the portable information terminals 200.

The server 100 is constituted by a host terminal order determination section 101, a group terminal connection status management section 102, a connection status sharing section 103, and a control section 104, as shown in FIG. 2(*a*). The host terminal order determination section 101 in a tethering state determines the selection order of the host terminal 200H for the portable information terminals 200-1 to 200-3, based at least on the reception quality from the base station 300 in each portable information terminal 200 connected by tethering, the remaining battery capacity of each portable information terminal 200, and either the allowable data transmission speed contracted for each portable information terminal 200 or the maximum data transmission speed notified from the network 400. The reception quality, the remaining battery level, and either the allowable data transmission speed or the maximum data transmission speed are hereinafter referred to as management information. Details of the method for determining the selection order of the host terminal 200H will be described later.

The group terminal connection status management section 102 manages the connection statuses of the portable information terminals 200-1 to 200-3 which belong to the same group and have been connected by the tethering function. Specifically, the group terminal connection status management section 102 identifies the portable information terminals 200-1 to 200-3 by a terminal ID assigned to each terminal, a MAC (Media Access Control) address, etc., and manages which of the terminals is the host terminal 200H and which of the terminals has been connected to a base station via the host terminal 200H, with the terminals owned by one user as the same group terminals. The connection status sharing section 103 collects and manages the above-described management information of the portable information terminals 200-1 to 200-3 belonging to the same group from the portable information terminals 200-1 to 200-3 connected in a tethering state, at predetermined time intervals.

The control section 104 performs a predetermined program and thereby performs the overall control of the operation of each section. Specifically, the control section 104 instructs the portable information terminals 200-1 to 200-3 to transition to the host terminal 200H, in accordance with a host terminal selection order determined by the host terminal order determination section 101.

Also, when downloaded data is to be shared by the portable information terminals 200-1 to 200-3, the control section 104 divides the file data and distributes the data to the portable information terminal 200-1 to 200-3 in the same group, in accordance with the above-described management information (the reception quality from the base station 300, and either the allowable data transmission speed contracted for each portable information terminal 200 or the maximum data transmission speed notified from the network 400) of the portable information terminals 200-1 to 200-3 belonging to the same group which has been managed by the connection status sharing section 103.

Moreover, when data downloaded by the portable information terminals 200-1 to 200-3 is shared, the control section 104 divides the file data into a predetermined packet size and can also be forwarded to the host terminal 200H.

The portable information terminal 200 includes a host terminal order determination section 201, a group terminal connection status management section 202, a download status storage section 203, a temporary data storage section 204, a connection status sharing section 205, and a control section 206, as shown in FIG. 2(*b*). The host terminal order determination section 201 determines, in a tethering state, a host terminal selection order for the portable information terminals 200-1 to 200-3, based on the reception quality from the base station 300 in each portable information terminal 200 connected by tethering, the remaining battery capacity of each portable information terminal 200, and either the allowable data transmission speed contracted for each portable information terminal 200 or the maximum data transmission speed notified from the network 400.

The group terminal connection status management section 202 manages the connection statuses of the portable information terminals 200-1 to 200-3 in the same group which are connected by the tethering function. Basically, the group terminal connection status management section 202 has the same function as the group terminal connection status management section 102 of the server 100. The download status storage section 203 stores the download status of shared data (what percent of data has been downloaded or how many packets have been downloaded). The temporary data storage section 204 temporarily stores data being downloaded. The connection status sharing section 205 collects the above-described management information of the portable information terminals 200-1 to 200-3 in the same group from the portable information terminals 200-1 to 200-3 connected in a tethering state, at predetermined time intervals, and manages them. That is, the above-described management information regarding the portable information terminals 200-1 to 200-3 is shared and managed by both the server 100 and the portable information terminals 200-1 to 200-3.

The control section 206 performs a predetermined program and thereby performs the overall control of the operation of each section. Specifically, the control section 206 performs control for switching the host terminal 200H according to an instruction by the above-described server 100, based on a host terminal selection order determined by the host terminal order determination section 101. Also, the control section 206 performs control for switching the host terminal 200H not according to an instruction by the server 100 but according to a host terminal selection order determined by the host terminal order determination section 201.

Moreover, when downloading shared data among the portable information terminals 200-1 to 200-3 from the server 100, the control section 206 downloads the data, extracts the downloaded data, stores the downloaded data in the temporary data storage section 204, stores the download status (percentage, the number of packets, etc.) of the (packet) data, and read outs a download status when the downloading of the data is restarted from the download status storage section 203.

Note that the download status storage section 203 and the temporary data storage section 204 described above may be rewritable non-volatile memories such as flash memories.

Next, an operation of the above-described embodiment is described.

Figure 3:
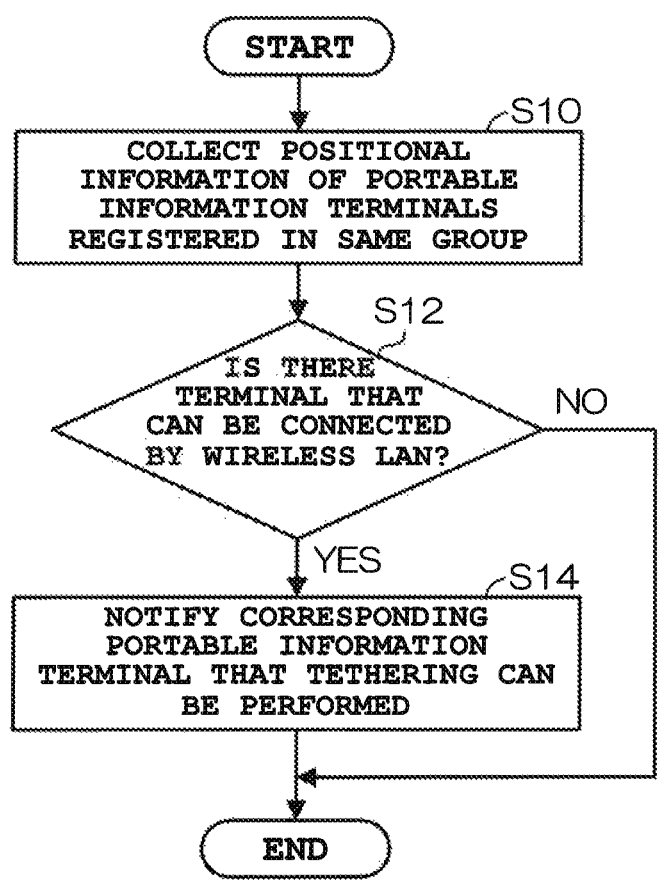
FIG. 3 is a flowchart for describing an operation of the server 100 according to the embodiment.

FIG. 3 is a flowchart for describing an operation of the server 100 according to the present embodiment. The server 100 connected to the base station 300 collects positional information indicating current positions reported to the base station 300 from the portable information terminals 200-1 to 200-3 registered in the same group (Step S10). Next, the server 100 judges by the group terminal connection status management section 102 whether there is a portable information terminal 200 in an area where a connection can be made by wireless LAN (Step S12). When there is a portable information terminal 200 in an area where a connection can be made by wireless LAN (YES at Step S12), the server 100 notifies this portable information terminal 200 that tethering can be performed, by the control section 104 (Step S14). Conversely, when there is no portable information terminal 200 in an area where a connection can be made by wireless LAN (NO at Step S12), the server 100 skips Step S14.

Figure 4:
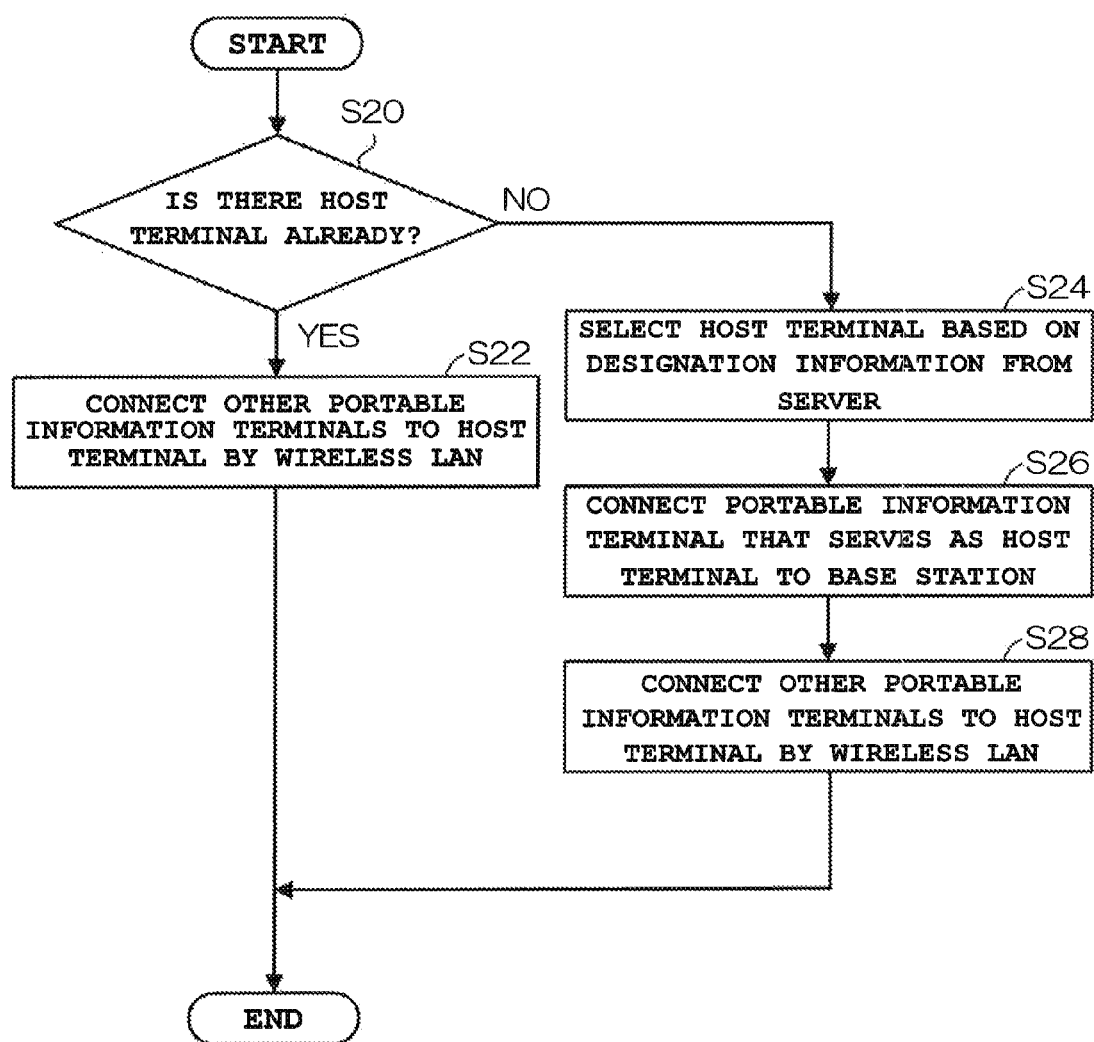
FIG. 4 is a flowchart for describing an operation of the portable information terminal 200 according to the embodiment.

FIG. 4 is a flowchart for describing an operation of the portable information terminal 200 according to the present embodiment. The portable information terminal 200 judges whether there is a portable information terminal 200 already operating as a host terminal 200H, by the group terminal connection status management section 202 (Step S20). When there is a portable information terminal 200 already operating as a host terminal 200H (YES at Step S20), the other portable information terminals 200 are connected to this host terminal 200H by wireless LAN after confirming a mutual connection permission (Step S22). Then, the processing is ended.

Also, when no portable information terminal 200 is operating as a host terminal 200H (NO at Step S20), the portable information terminals 200-1 to 200-3 selects a host terminal 200H, based on designation information indicating a host terminal which has been notified from the server 100 (Step S24). Note that the method for designating a host terminal will be described later. Next, the portable information terminal 200 selected as a host terminal 200H is connected to the base station 300 (Step S26), and the other portable information terminals 200 are connected to the host terminal 200H by wireless LAN (Step S28). Then, the processing is ended.

Note that, in the tethering state, the slowest speed among a total value of the contracted speeds, the maximum transmission speed of the portable information terminal serving as a host terminal, or a maximum data transmission speed notified from the network may be the upper limit of the transmission speed.

As a result, data communication taking maximum advantage of the channel density can be actualized.

Figure 5:
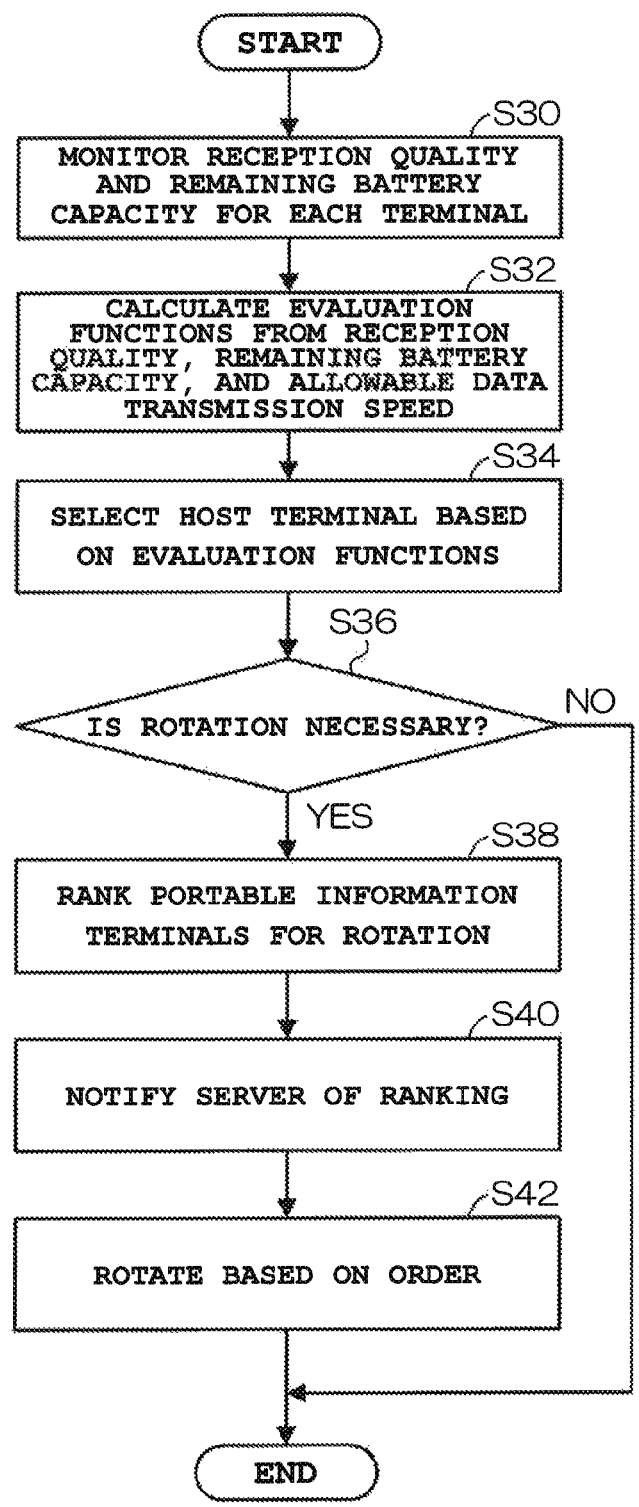
FIG. 5 is a flowchart for describing an operation of the portable information terminal 200 during communication by a tethering function in the embodiment.

FIG. 5 is a flowchart for describing an operation of the portable information terminal 200 during communication by a tethering function in the present embodiment. During communication by a tethering function, the portable information terminal 200 monitors, by the connection status sharing section 205, the reception quality from the base station 300 and the remaining battery capacity for each portable information terminal at a constant frequency (Step S30). Next, the host terminal 200H calculates evaluation functions from the reception quality, the remaining battery capacity, and the allowable data transmission speed contracted for each of the portable information terminals 200 (Step S32), and selects a portable information terminal 200 to serve as a host terminal 200H, based on the calculated evaluation functions (Step S34).

Next, the host terminal 200H judges whether rotation for switching the host terminal in a predetermined order is necessary (Step S36). For example, the host terminal 200H judges that rotation is necessary when the remaining battery capacity of the host terminal 200H itself is equal to or less than a predetermined threshold value, when there is a portable information terminal 200 present that has a higher reception quality, or when there is a portable information terminal 200 present that has a faster allowable data transmission speed. When the rotation is necessary (YES at Step S36), the host terminal 200H ranks the portable information terminals 200 for rotation by the host terminal order determination section 201 (Step S38).

For example, the portable information terminals 200 may be ranked in descending order of higher reception quality, remaining battery capacity, and either faster allowable data transmission speed or ranked by a priority set for each parameter. Also, the ranking order may be calculated by attaching a weight to each parameter.

Next, the host terminal 200H notifies a result of the ranking to the server 100 connected to the base station 300 (Step S40), and the portable information terminals 200-1 to 200-3 rotates (switches) the host terminal 200H, based on this order (Step S42). Then, the processing is ended.

Figure 6:
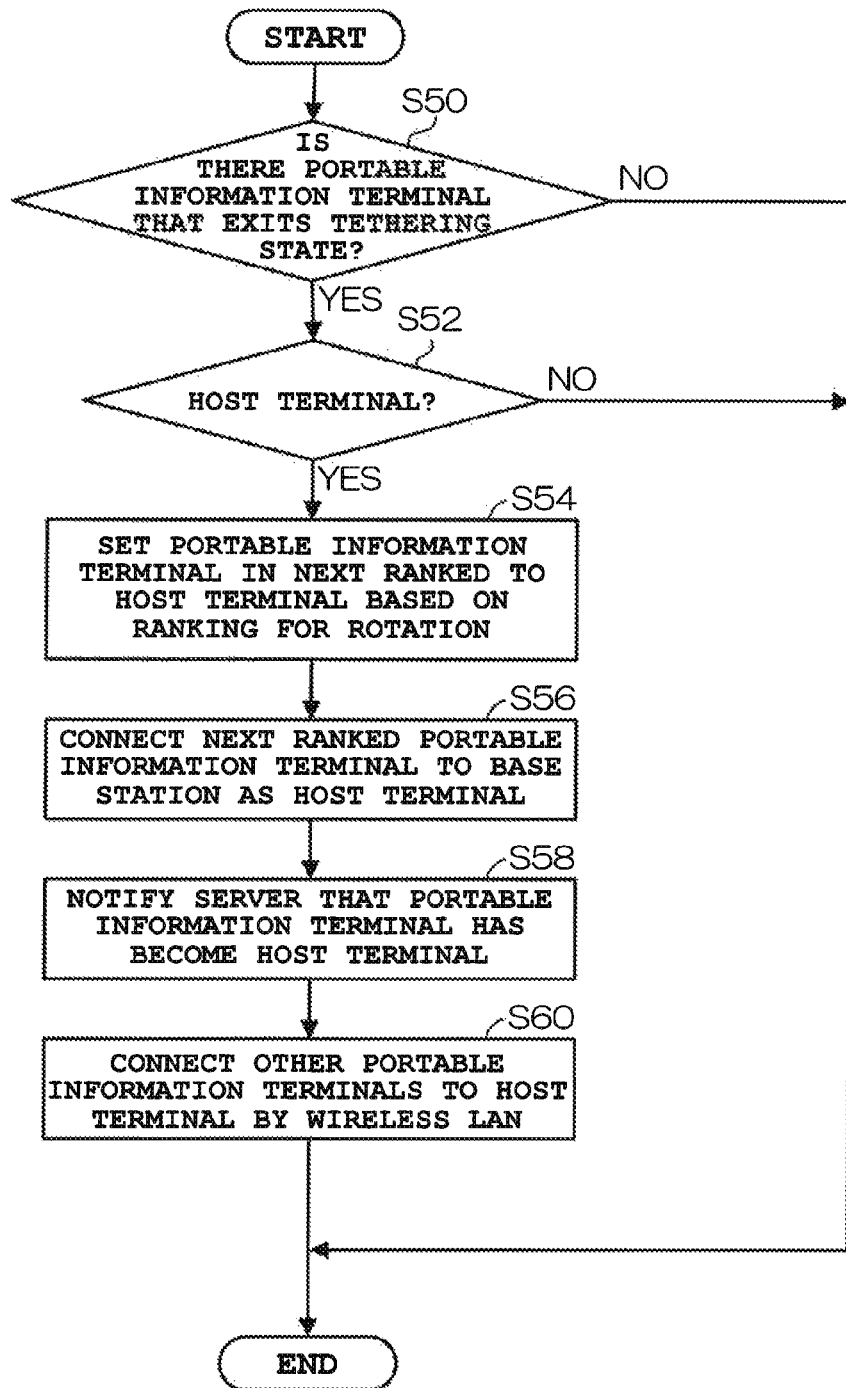
FIG. 6 is a flowchart for describing an operation to be performed when the portable information terminal 200 exits a tethering state in the embodiment.

FIG. 6 is a flowchart for describing an operation to be performed when the portable information terminal 200 exits a tethering state in the embodiment. First, each portable information terminal 200-1 to 200-3 judges whether there is a portable information terminal 200 that exits a tethering state (Step S50) and, when there is no portable information terminal 200 that exits a tethering state (NO at Step S50), ends the processing. Conversely, when there is a portable information terminal 200 that exits a tethering state (YES at Step S50), each portable information terminal 200-1 to 200-3 judges whether the portable information terminal 200 that exits a tethering state is a host terminal 200H (Step S52) and, when the portable information terminal 200 that exits a tethering state is not a host terminal 200H (NO at Step S52), ends the processing.

Conversely, when the portable information terminal 200 that exits a tethering state is a host terminal 200H (YES at Step S52), each portable information terminal 200 sets a portable information terminal 200 in the next rank to a host terminal 200H, based on the ranking for the rotation determined by the host terminal order determination section 201 (Step S54). Subsequently, the next ranked portable information terminal 200 is connected to the base station 300 as a host terminal 200H (Step S56), and notifies the server 100 connected to the base station 300 that this next ranked portable information terminal 200 has become a host terminal 200H (Step S58). The other portable information terminals 200 are connected to the portable information terminal 200 that has newly become a host terminal 200H by wireless LAN (Step S60). Then, the processing is ended.

By this configuration, a tethering state can be continued while keeping balance among the reception quality from the base station 300 in each portable information terminal 200, the remaining battery capacity of each portable information terminal 200, and either the allowable data transmission speed contracted for each portable information terminal 200 or the maximum data transmission speed notified from the network 400, whereby an excellent communication environment can be maintained.

Next, a case where data present on the network 400, such as content or a file, is shared by the portable information terminals 200 registered in advance as a group in the present embodiment is described. In this embodiment, the portable information terminals 200 share data downloaded using the tethering function where the portable information terminals 200 in proximity to each other are connected by wireless LAN, whereby loads on the network 400 are reduced.

Figure 7:
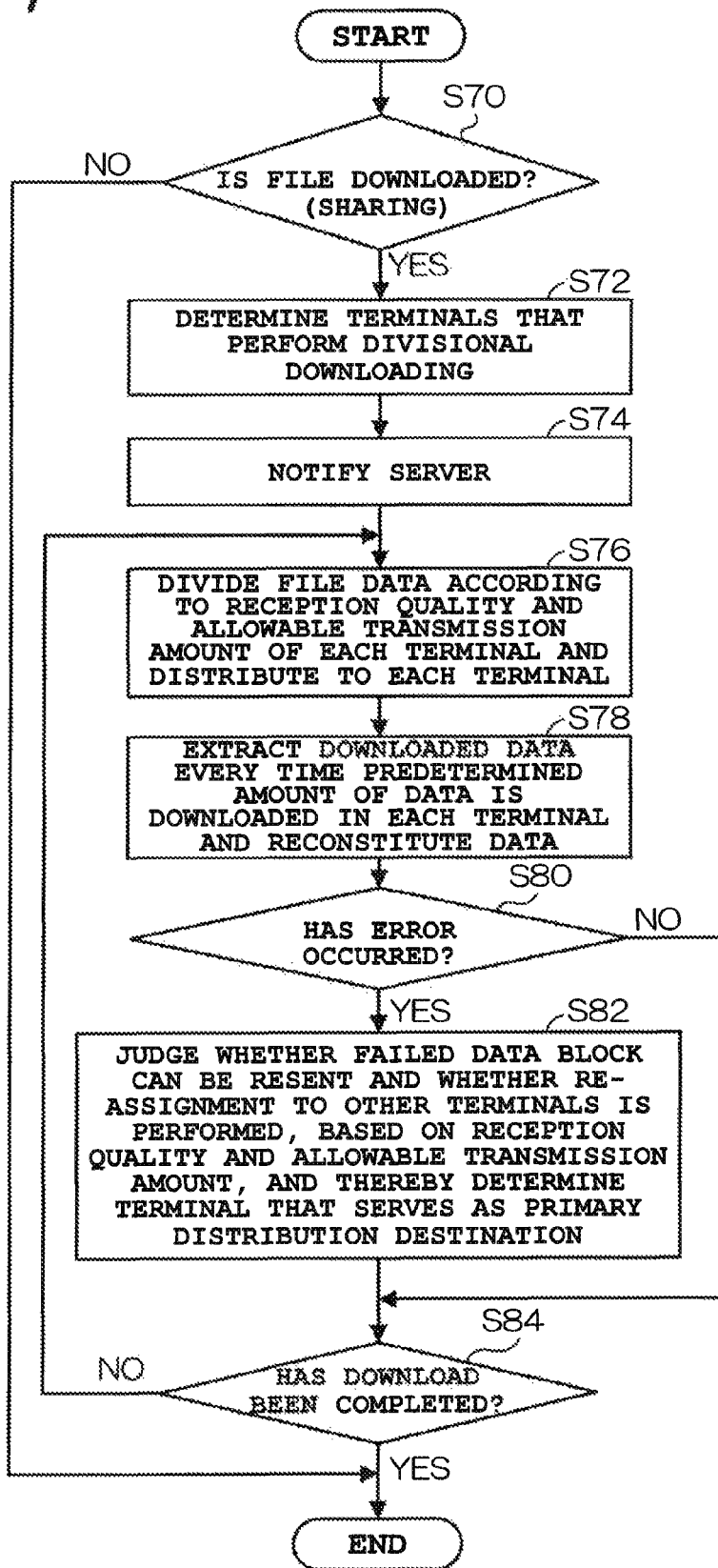
FIG. 7 is a flowchart for describing a file sharing operation by the portable information terminals 200 according to the embodiment.

FIG. 7 is a flowchart for describing a file sharing operation by the portable information terminals 200 according to the present embodiment. First, in the host terminal 200H, the control section 206 judges whether downloading premised on file sharing in a group has been selected by a user instruction or a request from the other portable information terminals 200 (Step S70). When the downloading premised on file sharing has not been selected (NO at Step S70), the control section 206 ends the processing.

Conversely, when the downloading premised on file sharing has not been selected (YES at Step S70), the control section 206 in the host terminal 200H determines portable information terminals 200 (determines at least one terminal, but may determine plural terminals) in the group which perform divisional downloading, based on management information (the reception quality from the base station 300, the remaining battery capacity, and either the contracted allowable data transmission speed or the maximum data transmission speed) in the connection status sharing section 205 (Step S72), and notifies the server 100 of this information (Step S74). These portable information terminals 200 which perform divisional downloading may be determined based on, for example, whether or not the reception quality, the remaining battery capacity, and either the contracted allowable data transmission speed or the maximum data transmission speed is equal to or more than a predetermined threshold value. Normally, all of the portable information terminals 200-1 to 200-3 shown in FIG. 1 are selected.

Next, in the server 100, the control section 104 divides a specified file data according to the reception quality, the contracted allowable data transmission speed, or the maximum data transmission speed of each determined portable information terminal 200, and starts the distribution of the data to the determined portable information terminals 200 (Step S76). Then, each portable information terminal 200 extracts the downloaded data whenever a predetermined amount of divided data has been downloaded, and thereby reconstitutes the data within each terminal (Step S78).

In each portable information terminal 200, the control section 206 judges whether the download has been failed, or in other words, judges whether an error has occurred during the downloading (Step S80). When the download has not been failed (NO at Step S80), the control section 206 judges whether the download has been completed (Step S84). When the download has not been completed (NO at Step S84), the control section 206 return to Step S76, and continues the download.

On the other hand, when the download has been failed (YES at Step S80), the control section 206 in each portable information terminal 200 judges again whether the failed data block can be resent and whether reassignment to the other portable information terminals 200 is performed, based on the reception quality and the contracted allowable data transmission speed or the maximum data transmission speed being managed by the connection status sharing section 205, and thereby determines a portable information terminal 200 to serve as a primary distribution destination (Step S82). Next, the control section 206 judges whether the download has been completed (Step S84). When the download has not been completed (NO at Step S84), the control section 206 return to Step S76, and continues the download. In this case, the portable information terminals 200 which perform the divisional downloading are changed due to the occurred error. On the other hand, when the download has been completed (YES at Step S84) the control section 206 ends the processing.

By the above-described processing, all of the divided data are downloaded to each portable information terminal 200-1 to 200-3, and accordingly the same data is reconstructed in each portable information terminal 200-1 to 200-3.

Next, an operation in data sharing is described.

Figure 8:
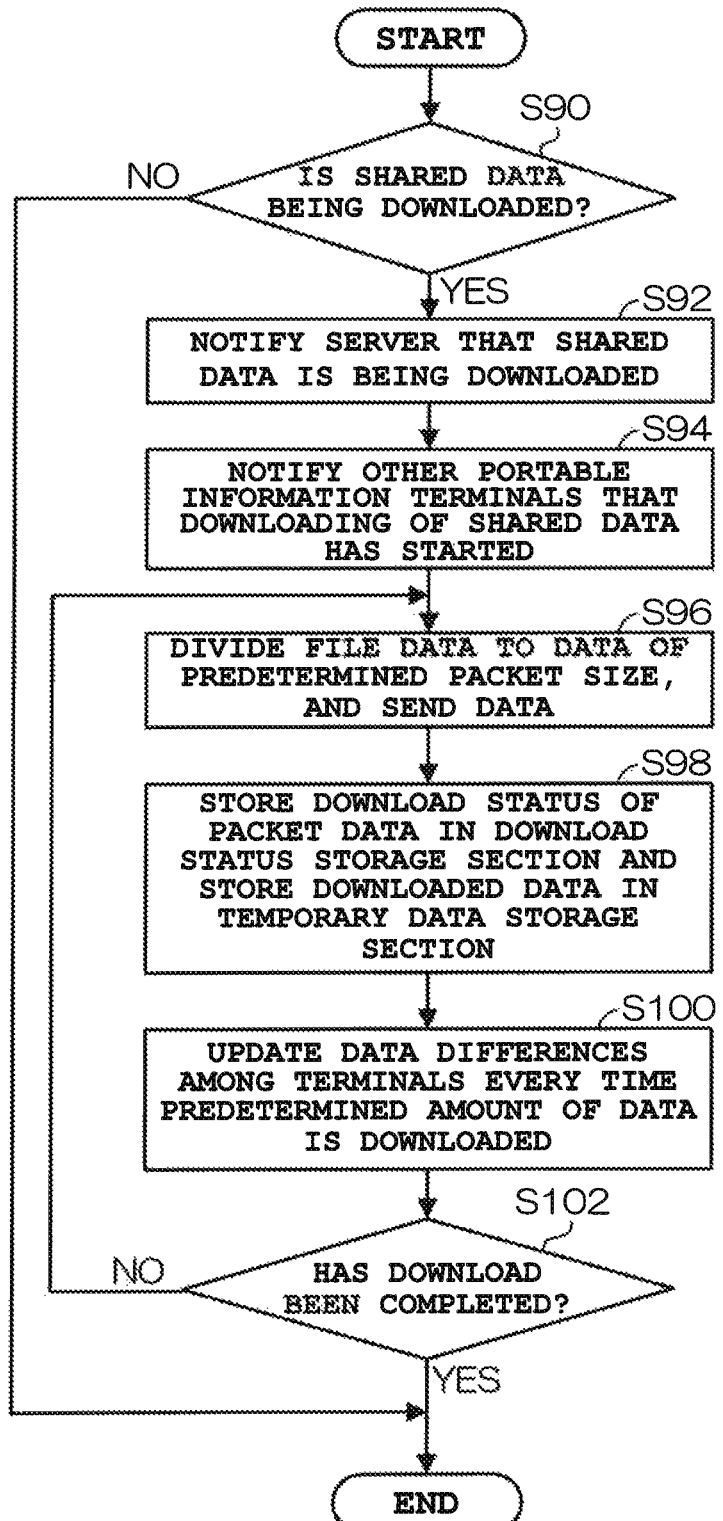
FIG. 8 is a flowchart for describing file sharing operations by the server 100 and the portable information terminal 200 according to the embodiment.

FIG. 8 is a flowchart for describing file sharing operations by the server 100 and the portable information terminals 200 according to the embodiment. First, in the host terminal 200H, the control section 206 judges whether downloading premised on file sharing in a group has been selected by a user instruction or a request from the other portable information terminals 200 (Step S90). When the downloading premised on file sharing has not been selected (NO at Step S90), the control section 206 ends the processing.

Conversely, when the downloading premised on file sharing has not been selected (YES in Step S90), the control section 206 in the host terminal 200H notifies the server 100 connected to the base station 300 that shared data is being downloaded (Step S92), and notifies the other portable information terminals 200 in the group that the downloading of shared data has started (Step S94).

Next, in the server 100, the control section 104 divides the specified data to packet data of a predetermined size, and sends the packet data (Step S96). Then, in the host terminal 200H, the control section 206 stores the download status of received packet data in the download status storage section 203 and stores the downloaded data in the temporary data storage section 204 (Step S98).

Also, the control section 206 of the host terminal 200H updates data differences among the connected portable information terminals 200 in the same group whenever a predetermined amount of data has been downloaded, and shares the download status (Step S100). Next, the control section 206 judges whether the download has been completed (Step S102). When the download has not been completed (NO at Step S102), the control section 206 returns to Step S96, and continues the download. Conversely, when the download has been completed (YES at Step S102), the control section 206 ends the processing concerned are ended.

In the above-described processing, data is once downloaded to the host terminal 200H, and data differences among the portable information terminals 200-1 to 200-3 are updated for each predetermined amount of data. Therefore, even when the host terminal 200H is switched, downloading can be smoothly restarted. Also, data can be shared among the portable information terminals 200-1 to 200-3.

Next, an operation when a particular portable information terminal exits a tethering state during download of shared data is described.

Figure 9:
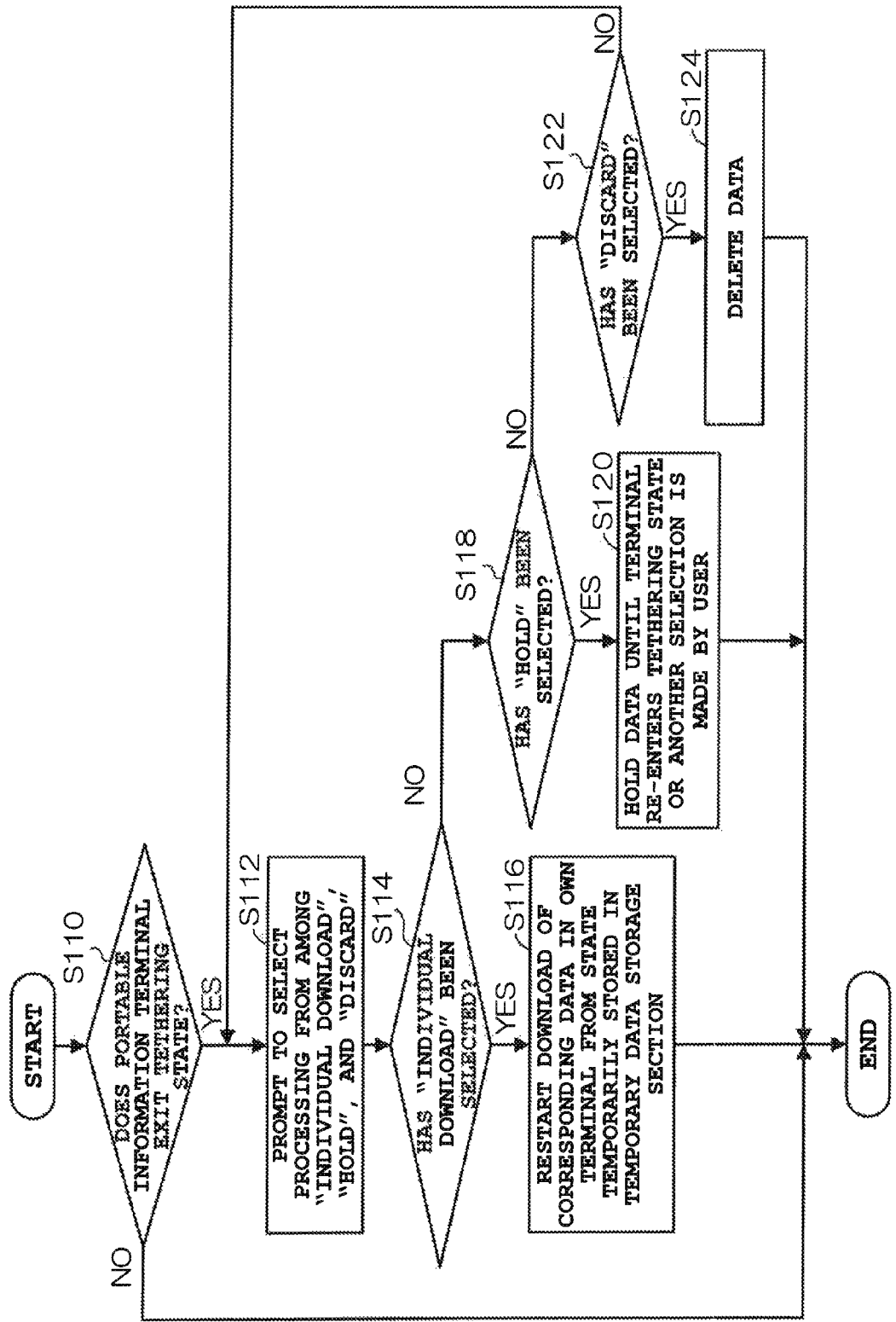
FIG. 9 is a flowchart for describing an operation to be performed when a particular portable information terminal exits a tethering state during the download of shared data.

FIG. 9 is a flowchart for describing an operation to be performed when a particular portable information terminal exits a tethering state during download of shared data.

First, in the portable information terminal 200, the control section 206 judges whether to exit a tethering state (Step S110). When not exiting a tethering state (NO at Step S110), the control section 206 ends the processing (NO at Step S110). Conversely, when exiting a tethering state, the control section 206 of the portable information terminal 200 prompts the user to select processing for temporary data in the temporary data storage section 204, from among "INDIVIDUAL DOWNLOAD", "HOLD", and "DISCARD" (Step S112).

Next, the control section 206 of the portable information terminal 200 judges whether "INDIVIDUAL DOWNLOAD" has been selected by the user (Step S114). When "INDIVIDUAL DOWNLOAD" has been selected (YES at Step S114), the control section 206 restarts, in its terminal, the download of the data from the state of temporarily being stored in the temporary data storage section 204 (Step S116). Then, the control section 206 ends the processing.

On the other hand, when "INDIVIDUAL DOWNLOAD" has not been selected by the user (NO at Step S114), the control section 206 judges whether "HOLD" has been selected (Step S118). When "HOLD" has been selected (YES at Step S118), the control section 206 holds the data until it re-enters a tethering state or another selection is made by the user (Step S120). Then, the control section 206 ends the processing.

On the other hand, when "HOLD" has not been selected by the user (NO at Step S118), the control section 206 judges whether "DISCARD" has been selected (Step S122). When "DISCARD" has been selected (YES at Step S122), the control section 206 deletes the data temporarily stored in the temporary data storage section 204 (Step S124). Then, the control section 206 ends the processing.

On the other hand, when "DISCARD" has not been selected (NO at Step S122), the control section 206 returns to Step S112, and repeats the above-described processing.

By the above-described processing, even when the portable information terminal 200 exits a tethering state during the download of shared data, the downloading can be smoothly restated.

In the above-described embodiment, the host terminal 200H which communicates with a base station is switched by rotation, based at least on reception quality from the base station, remaining battery capacity, and either a contracted allowable data transmission speed or a maximum data transmission speed notified from a network. Accordingly, efficient data communication can be actualized while preventing excessive battery drain in a particular portable information terminal.

Also, in the above-described embodiment, the slowest speed among a total value of contracted speeds, the maximum transmission speed of a portable information terminal serving as a host terminal, or a maximum data transmission speed notified from a network is the upper limit of a transmission speed in a tethering state. As a result, data communication taking maximum advantage of channel density can be actualized.

Moreover, in the above-described embodiment, shared data is shared in tethering communication. Therefore, the load on the network 400 such as the base station 300 and the server 100 can be reduced.

In the above-described embodiment, in a case where a whole data flow is controlled by a channel accommodation capacity, the data flow of the portable information terminals 200 in a group may be distributed according to a reception quality, an allowable data transmission speed, or a maximum data communication speed notified from the network 400, based on a channel allowable amount assigned to each group.

Also, in the above-described embodiment, when an allowable data transmission speed is relatively slow but a reception quality is remarkably favorable, downloading may be performed by the allowable data transmission speed of the portable information terminal 200 being temporarily increased with the sum of communication allowable amounts in the group as an upper limit.

Moreover, in the above-described embodiment, a configuration may be adopted in which the server 100 side compiles information regarding shared data held by the portable information terminals 200 in a group, and provides the information when necessary, in response to an inquiry from the portable information terminal 200.

Furthermore, in the embodiment of the present invention, the present invention has been applied to a mobile phone or a smartphone as a portable information terminal. However, the present invention can be widely applied to a terminal device of a portable or stationary type having a wireless LAN function and a tethering function, such as a digital camera, a game machine, a tablet PC (Personal Computer), a notebook PC, a PDA (Personal Data Assistant: portable information terminal), and other electronic devices.

This application is based upon and claims the benefit of priority from the prior Japanese Patent Application No. 2013-035691 filed on Feb. 26, 2013, the entire contents of which are incorporated herein by reference.

Hereinafter, Supplementary Notes describe the characteristics of the present invention.

The above-described embodiment can be partially or entirely described as in the following Supplementary Notes; however, the embodiment is not limited to these Supplementary Notes.

(Supplementary Note 1)

Figure 10:
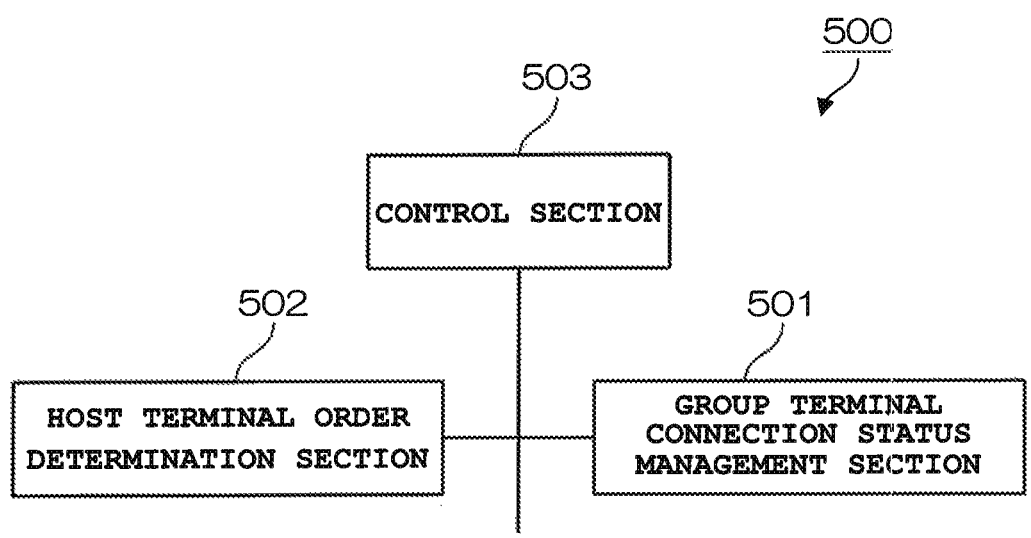
FIG. 10 is a block diagram showing the configuration of Supplementary Note 1.

FIG. 10 is a block diagram showing the configuration of Supplementary Note 1. As shown in FIG. 10, the invention of Supplementary Note 1 is a portable information terminal 500 having a tethering function for operating as a host terminal which is connected to a base station by use of first wireless communication and connects other portable information terminals to the base station by use of second wireless communication, comprising:

a group terminal connection status management section 501 which manages connection statuses of a plurality of portable information terminals belonging to the same group connected by the tethering function;

a host terminal order determination section 502 which determines selection order of a portable information terminal to serve as the host terminal from among the portable information terminals belonging to the same group including its own terminal and managed by the group terminal connection status management section 501, based at least on reception quality from the base station, remaining battery capacity, and either a contracted allowable data transmission speed or a maximum data transmission speed notified from a network; and a control section 503 which controls whether to operate as the host terminal or to communicate with the base station via the host terminal, based on the selection order determined by the host terminal order determination section 502.

(Supplementary Note 2)

The portable information terminal according to Supplementary Note 1, further comprising:

a connection status sharing section which collects, from each portable information terminal, the reception quality from the base station, the remaining battery capacity, and either the contracted allowable data transmission speed or the maximum data transmission speed related to each portable information terminal at predetermined time intervals, and updates the reception quality, the remaining battery capacity, and either the contracted allowable data transmission speed or the maximum data transmission speed when necessary.

(Supplementary Note 3)

The portable information terminal according to Supplementary Note 1, wherein the control section switches the portable information terminal serving as the host terminal, based on the selection order determined by the host terminal order determination section.

(Supplementary Note 4)

The portable information terminal according to Supplementary Note 1, wherein the control section switches the portable information terminal serving as the host terminal, based on the selection order determined by the host terminal order determination section, at least when the remaining battery capacity of the portable information terminal serving as the host terminal is equal to or less than a predetermined threshold value, when there is a portable information terminal is present that has higher reception quality from the base station, when there is a portable information terminal present that has faster contracted allowable data transmission speed, or when there is a portable information terminal present that has faster maximum data transmission speed notified from the network.

(Supplementary Note 5)

The portable information terminal according to Supplementary Note 1, wherein the control section switches the host terminal to a portable information terminal to serve as next host terminal, based on the selection order determined by the host terminal order determination section, when the host terminal exits a connection established by the tethering function.

(Supplementary Note 6)

A communication system constituted by a plurality of portable information terminals having a tethering function for operating as a host terminal which is connected to a base station using a first wireless communication and connects other portable information terminals to the base station using a second wireless communication, and a server connected to the base station, the server comprising: a group terminal connection status management section which manages connection statuses of the plurality of portable information terminals belonging to the same group connected by the tethering function; a host terminal order determination section which determines selection order of a portable information terminal to serve as the host terminal from among the portable information terminals belonging to the same group including its own terminal and managed by the group terminal connection status management section, based at least on reception quality from the base station, remaining battery capacity, and either a contracted allowable data transmission speed or a maximum data transmission speed notified from a network; and a first control section which, when there is no portable information terminal operating as the host terminal, provides an instruction to a portable information terminal that can operate as the host terminal to serve as the host terminal, based on the selection order determined by the host terminal order determination section, and wherein the plurality of portable information terminals comprise: a second control section which controls the portable information terminal to operate as the host terminal for connection to the base station by the second wireless communication, according to the instruction from the server.

(Supplementary Note 7)

The communication system according to Supplementary Note 6, wherein the second control section in the host terminal determines a portable information terminal that performs divisional downloading when downloading premised on file sharing is performed, based at least on parameters of the reception quality from the base station, the remaining battery capacity, and either the contracted allowable data transmission speed or the maximum data transmission speed related to each portable information terminal, and notifies the server of the determined portable information terminal via the base station, wherein the first control section in the server divides object file data, based at least on the reception quality from the base station, and either the contracted allowable data transmission speed or the maximum data transmission speed related to the determined portable information terminal, and distributes the divided file data to the determined portable information terminal, and wherein the portable information terminal sequentially extracts the divided data distributed from the server to reconstitute the data.

(Supplementary Note 8)

The communication system according to Supplementary Note 6, wherein the second control section in the host terminal notifies the server that the downloading premised on file sharing is being performed and notifies other portable information terminals that downloading of shared data has started, wherein the first control section in the server divides the shared data into packet data of a predetermined size and transmits the packet data to the host terminal, and wherein the second control section in the host terminal updates data differences from among the other portable information terminals whenever a predetermined amount of data has been downloaded.

(Supplementary Note 9)

A communication control method for a portable information terminal having a tethering function for operating as a host terminal which is connected to a base station using a first wireless communication and connects other portable information terminals to the base station using a second wireless communication, comprising:

a group terminal connection status management step of managing connection statuses of a plurality of portable information terminals belonging to the same group connected by the tethering function;

a host terminal order determination step of determining selection order of a portable information terminal to serve as the host terminal from among the portable information terminals belonging to the same group including its own terminal, based at least on reception quality from the base station, remaining battery capacity, and either a contracted allowable data transmission speed or a maximum data transmission speed notified from a network; and a control step of controlling whether to operate as the host terminal or to communicate with the base station via the host terminal, based on the selection order determined in the host terminal order determination step.

(Supplementary Note 10)

A non-transitory computer-readable storage medium having stored thereon a program that is executable by a processor in a portable information terminal having a tethering function for operating as a host terminal which is connected to a base station using a first wireless communication and connects other portable information terminals to the base station using a second wireless communication the program being executable by the processor to actualize functions comprising:

a group terminal connection status management function for managing connection statuses of a plurality of portable information terminals belonging to the same group connected by the tethering function;

a host terminal order determination function for determining selection order of a portable information terminal to serve as the host terminal from among the portable information terminals belonging to the same group including its own terminal, based at least on reception quality from the base station, remaining battery capacity, and either a contracted allowable data transmission speed or a maximum data transmission speed notified from a network; and a control function for controlling whether to operate as the host terminal or to communicate with the base station via the host terminal, based on the selection order determined by the host terminal order determination function.

DESCRIPTION OF REFERENCE NUMERALS

100 server
101 host terminal order determination section
102 group terminal connection status management section
103 connection status sharing section
104 control section
200-1 to 200-3 portable information terminals 200*h* host terminals
201, 502 host terminal order determination sections
202, 501 group terminal connection status management section
203 download status storage section
204 temporary data storage section
205 connection status sharing section
206, 503 control section
300 base station
400 network
1000 communications system

What is claimed is:

1. A portable information terminal having a tethering function for operating as a host terminal which is connected to a base station using a first wireless communication and connects other portable information terminals to the base station using a second wireless communication, comprising:
a group terminal connection status management section which manages connection statuses of a plurality of other portable information terminals connected to the host terminal by the tethering function and belonging to the same group as the portable information terminal;
a host terminal order determination section which determines selection order of a portable information terminal to serve as the host terminal from among the portable information terminal and the plurality of other portable information terminals managed by the group terminal connection status management section, based on at least any of reception quality from the base station in each portable information terminal of the portable information terminal and the plurality of other portable information terminal, remaining battery capacity of the each portable information terminal, a contracted allowable data transmission speed for the each portable information terminal, and a maximum data transmission speed notified from a network for the each portable information terminal; and
a control section which controls whether to operate as the host terminal or to communicate with the base station via the host terminal, based on the selection order determined by the host terminal order determination section.

2. The portable information terminal according to claim 1, further comprising:
a connection status sharing section which collects, from each portable information terminal, the reception quality from the base station, the remaining battery capacity, and either the contracted allowable data transmission speed or the maximum data transmission speed related to each portable information terminal at predetermined time intervals, and updates the reception quality, the remaining battery capacity, and either the contracted allowable data transmission speed or the maximum data transmission speed when necessary.

3. The portable information terminal according to claim 1, wherein the control section switches a portable information terminal serving as the host terminal, based on the selection order determined by the host terminal order determination section.

4. The portable information terminal according to claim 1, wherein the control section switches the portable information terminal serving as the host terminal, based on the selection order determined by the host terminal order determination section, at least when the remaining battery capacity of the portable information terminal serving as the host terminal is equal to or less than a predetermined threshold value, when there is a portable information terminal present that has a higher reception quality from the base station, when there is a portable information terminal present that has a faster contracted allowable data transmission speed, or when there is a portable information terminal present that has a faster maximum data transmission speed notified from the network.

5. The portable information terminal according to claim 1, wherein the control section switches the host terminal to a portable information terminal to serve as next host terminal, based on the selection order determined by the host terminal order determination section, when the host terminal exits a connection established by the tethering function.

6. A communication system constituted by a plurality of portable information terminals having a tethering function for operating as a host terminal which is connected to a base station using a first wireless communication and connects other portable information terminals to the base station using a second wireless communication, and a server connected to the base station, the server comprising:
a group terminal connection status management section which manages connection statuses of the plurality of portable information terminals connected to the host terminal by the tethering function and belonging to the same group;
a host terminal order determination section which determines selection order of a portable information terminal to serve as the host terminal from among the plurality of portable information terminals managed by the group terminal connection status management section, based on at least any of reception quality from the base station, remaining battery capacity, a contracted allowable data transmission speed, and a maximum data transmission speed notified from a network, of the respective plurality of other portable information terminals; and
a first control section which, when there is no portable information terminal operating as the host terminal, provides an instruction to a portable information terminal that can operate as the host terminal to serve as the host terminal, based on the selection order determined by the host terminal order determination section, and
wherein the plurality of portable information terminals comprise:
a second control section which controls to operate as a host terminal connected to the base station using the second wireless communication, according to the instruction from the server.

7. The communication system according to claim 6, wherein the second control section in the host terminal determines a portable information terminal that performs divisional downloading when downloading premised on file sharing is performed, based on at least parameters of the reception quality from the base station, the remaining battery capacity, and either the contracted allowable data transmission speed or the maximum data transmission speed related to each portable information terminal, and notifies the server of the determined portable information terminal via the base station,
wherein the first control section in the server divides object file data, based at least on the reception quality from the base station, and either the contracted allowable data transmission speed or the maximum data transmission speed related to the determined portable information terminal, and distributes the divided file data to the determined portable information terminal; and wherein the portable information terminal sequentially extracts the divided data distributed from the server to reconstitute the data.

8. The communication system according to claim 6, wherein the second control section in the host terminal notifies the server that downloading premised on file sharing is being performed and notifies other portable information terminals that downloading of shared data has started,
wherein the first control section in the server divides the shared data into packet data of a predetermined size and transmits the packet data to the host terminal, and
wherein the second control section in the host terminal updates data differences from among the other portable information terminals whenever a predetermined amount of data has been downloaded.

9. A communication control method for a portable information terminal having a tethering function for operating as a host terminal which is connected to a base station using a first wireless communication and connects other portable information terminals to the base station using a second wireless communication, comprising:
  a group terminal connection status management step of managing connection statuses of a plurality of other portable information terminals connected to the host terminal by the tethering function and belonging to the same group as the portable information terminal;
  a host terminal order determination step of determining selection order of a portable information terminal to serve as the host terminal from among the portable information terminal and the plurality of other portable information terminals managed in the group terminal connection status management step, based on at least any of reception quality from the base station, remaining battery capacity, a contracted allowable data transmission speed, and a maximum data transmission speed notified from a network, of the portable information terminal and the respective plurality of other portable information terminals; and
  a control step of controlling whether to operate as the host terminal or to communicate with the base station via the host terminal, based on the selection order determined in the host terminal order determination step.

10. A non-transitory computer-readable storage medium having stored thereon a program that is executable by a processor in a portable information terminal having a tethering function for operating as a host terminal which is connected to a base station using a first wireless communication and connects other portable information terminals to the base station using a second wireless communication, the program being executable by the processor to actualize functions comprising:
  a group terminal connection status management function for managing connection statuses of a plurality of other portable information terminals connected to the host terminal by the tethering function and belonging to the same group as the portable information terminal;
  a host terminal order determination function for determining selection order of a portable information terminal to serve as the host terminal from among the portable information terminal and the plurality of other portable information terminals managed by the group terminal connection status management function, based on at least any of reception quality from the base station, remaining battery capacity, a contracted allowable data transmission speed, and a maximum data transmission speed notified from a network, of the portable information terminal and the respective plurality of other portable information terminals; and
  a control function for controlling whether to operate as the host terminal or to communicate with the base station via the host terminal, based on the selection order determined by the host terminal order determination function.

* * * * *